United States Patent
Keller et al.

(10) Patent No.: US 12,481,900 B2
(45) Date of Patent: Nov. 25, 2025

(54) PROBABILISTIC MODEL CALIBRATION AND ESTIMATION FOR DRILLING STEERING CONTROL

(71) Applicant: Halliburton Energy Services, Inc., Houston, TX (US)

(72) Inventors: Alexander Mathew Keller, Austin, TX (US); Vy Pho, Houston, TX (US); Umut Zalluhoglu, Humble, TX (US); Robert P. Darbe, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 916 days.

(21) Appl. No.: 16/926,841

(22) Filed: Jul. 13, 2020

(65) Prior Publication Data
US 2021/0103843 A1 Apr. 8, 2021

Related U.S. Application Data

(60) Provisional application No. 62/910,921, filed on Oct. 4, 2019.

(51) Int. Cl.
*E21B 44/00* (2006.01)
*E21B 7/06* (2006.01)
(Continued)

(52) U.S. Cl.
CPC .......... *G06N 7/01* (2023.01); *E21B 7/06* (2013.01); *E21B 44/005* (2013.01); *G05B 15/02* (2013.01); *G06F 17/18* (2013.01); *E21B 2200/20* (2020.05)

(58) Field of Classification Search
CPC .... E21B 2200/20; E21B 44/00; E21B 44/005; E21B 7/06; G05B 15/02; G06F 17/18; G06N 7/01
See application file for complete search history.

(56) References Cited

U.S. PATENT DOCUMENTS 6,438,495 B1 8/2002 Chau et al.
8,553,497 B2 10/2013 Krohn
(Continued)

FOREIGN PATENT DOCUMENTS

WO 2018080450 A1 5/2018

OTHER PUBLICATIONS

Zhu et al. Seismic inversion and uncertainty quantification using transdimensional Markov chain Monte Carlo method. Department of Geology & Geophysics, Texas A&M University, Dec. 19, 2017, pp. 1-58 (Year: 2017).*
(Continued)

*Primary Examiner* — Yuhui R Pan
(74) *Attorney, Agent, or Firm* — Benjamin Ford; C. Tumey Law Group PLLC (57) ABSTRACT

A method for calibrating a steering model may comprise estimating an initial condition for one or more variables in the steering model and calibrating the steering model with a Markov Chain Monte Carlo Simulation (MCMC). A drilling system may comprise a bottom hole assembly, a drill string connected to the bottom hole assembly, and an information handling system connected to the bottom hole assembly. The information handling system may be configured to process one or more measurements from the bottom hole assembly, calibrate a steering model based at least in part on the one or more measurements, adjust a control logic based at least in part on the steering model, and adjust the bottom hole assembly based at least in part on the control logic.

20 Claims, 4 Drawing Sheets

(51) Int. Cl.
*G05B 15/02* (2006.01)
*G06F 17/18* (2006.01)
*G06N 7/01* (2023.01)

(56) References Cited

U.S. PATENT DOCUMENTS

| | | | |
|---|---|---|---|
| 8,676,558 | B2 | 3/2014 | Pirovolou |
| 9,347,308 | B2 | 5/2016 | Benson et al. |
| 10,323,499 | B2 | 6/2019 | Dykstra et al. |
| 2007/0168133 | A1 | 7/2007 | Bennett et al. |
| 2011/0172976 | A1* | 7/2011 | Budiman ............... E21B 47/04 703/2 |
| 2011/0213601 | A1 | 9/2011 | Pirovolou |
| 2012/0024606 | A1 | 2/2012 | Pirovolou et al. |
| 2012/0118637 | A1* | 5/2012 | Wang ............... E21B 44/00 700/29 |
| 2013/0080129 | A1* | 3/2013 | Smith ............... G06N 20/00 703/6 |
| 2016/0109605 | A1 | 4/2016 | Schlumberger |
| 2017/0176622 | A1 | 6/2017 | Schlumberger |
| 2017/0328181 | A1 | 11/2017 | Kristjansson et al. |
| 2018/0066475 | A1 | 3/2018 | Vadali et al. |
| 2019/0145241 | A1 | 5/2019 | Hughes |
| 2021/0102461 | A1* | 4/2021 | Kumar ............... E21B 49/008 |

OTHER PUBLICATIONS

"Using Trees, Bagging, and Random Forests to Predict Rate of Penetration During Drilling" from "SPE Middle East Intelligent Oil & Gas Conference & Exhibition held in Abu Dhabi, UAE, Sep. 15-16, 2015" (Year: 2015).*

Efron "Estimation and Accuracy After Model Selection" from "Journal of the American Statistical Association, Sep. 2014" (Year: 2014).*

Schlumberger—Remote Directional Drilling Sets Roadmap to Industrialization, Abbl Drilling Operations Advisor Service, 2016.

International Search Report for Application No. PCTUS2020043070 Dated Oct. 30.

Zhu et al. Seismic inversion and uncertainty quantification using transdimen sional Markov chain Monte Carlo method. Department of Geology & Geophysics, Texas A&M University, Dec. 19, 2017, pp. 1-58. abstract, pp. 3-44, and figure 5.

International Search Report for Application No. PCT/US2020/041995 Dated Oct. 30, 2020.

MIT OpenCourseWare. "Classical Mechanics." MIT open-source reference, Chapter 11: Reference Frames, pp. 11-1-11-10, 2022. PDF file. 11 pages.

* cited by examiner

PROBABILISTIC MODEL CALIBRATION AND ESTIMATION FOR DRILLING STEERING CONTROL

BACKGROUND

Wellbores drilled into subterranean formations may enable recovery of desirable fluids (e.g., hydrocarbons) using any number of different techniques. In drilling operations, typical drilling processes may be relatively complex and involve considerable expense. Most of these operations are done manually with experienced operators running the drilling platform. There is a continual effort in the industry to develop improvement in safety, cost minimization, and efficiency. The advancements of computerized and automated systems in drilling processes are the next step in achieving these goals. With robotic and automated systems for drilling processes in early stages of development for the industry, there is a need for more efficient, improved, and optimized drilling processes.

Current methods and systems for automated drilling require calibration. For example, during drilling operation, both onshore and offshore, to control a directional well an accurate model of the system's steering behavior is needed which maps inputs to output responses. Due to numerous unknowns of the environment downhole and in the system, the model must be continually updated with measurements from the field to remain accurate and useful. Furthermore, closed loop steering control requires feedback of the position and orientation of the drill bit. An accurate steering model is therefore doubly useful since it may also provide a means of estimating the drill bit position and attitude to use as real time feedback to the controller. Due to the non-linearity of steering models, parameter estimation becomes an unstable and underdefined problem with infinitely many solutions. In addition, numerous uncertainties in the form of sensor malfunctions, vibrations, and model-system discrepancies create instances where model calibration will produce a poor model for use in steering control and should therefore be bypassed in some way.

BRIEF DESCRIPTION OF THE DRAWINGS

These drawings illustrate certain aspects of some examples of the present disclosure and should not be used to limit or define the disclosure.

DETAILED DESCRIPTION

This disclosure details a methods and systems for calibrating a steering model and estimating drill-bit position and orientation both in real-time and after operations. Generally, the systems and methods discussed below relate to a system and method for estimation of model parameters and the drill bit position and orientation with a moving horizon Markov Chain Monte Carlo (MCMC) sampling. The algorithm combines the steering inputs, all available measurements (accelerometers and magnetometers placed anywhere along the drill string), an estimate of the measurement uncertainty, and prior distributions for each parameter, to produce a model of the system's steering behavior. The estimate of measurement uncertainty is automatically calculated by the algorithm with several loosely constrained model-based least-squares optimizations. Additionally, initial conditions for the model are estimated with a statistical bagging approach which provides prior distributions for the initial conditions to the MCMC estimation.

Figure 1:
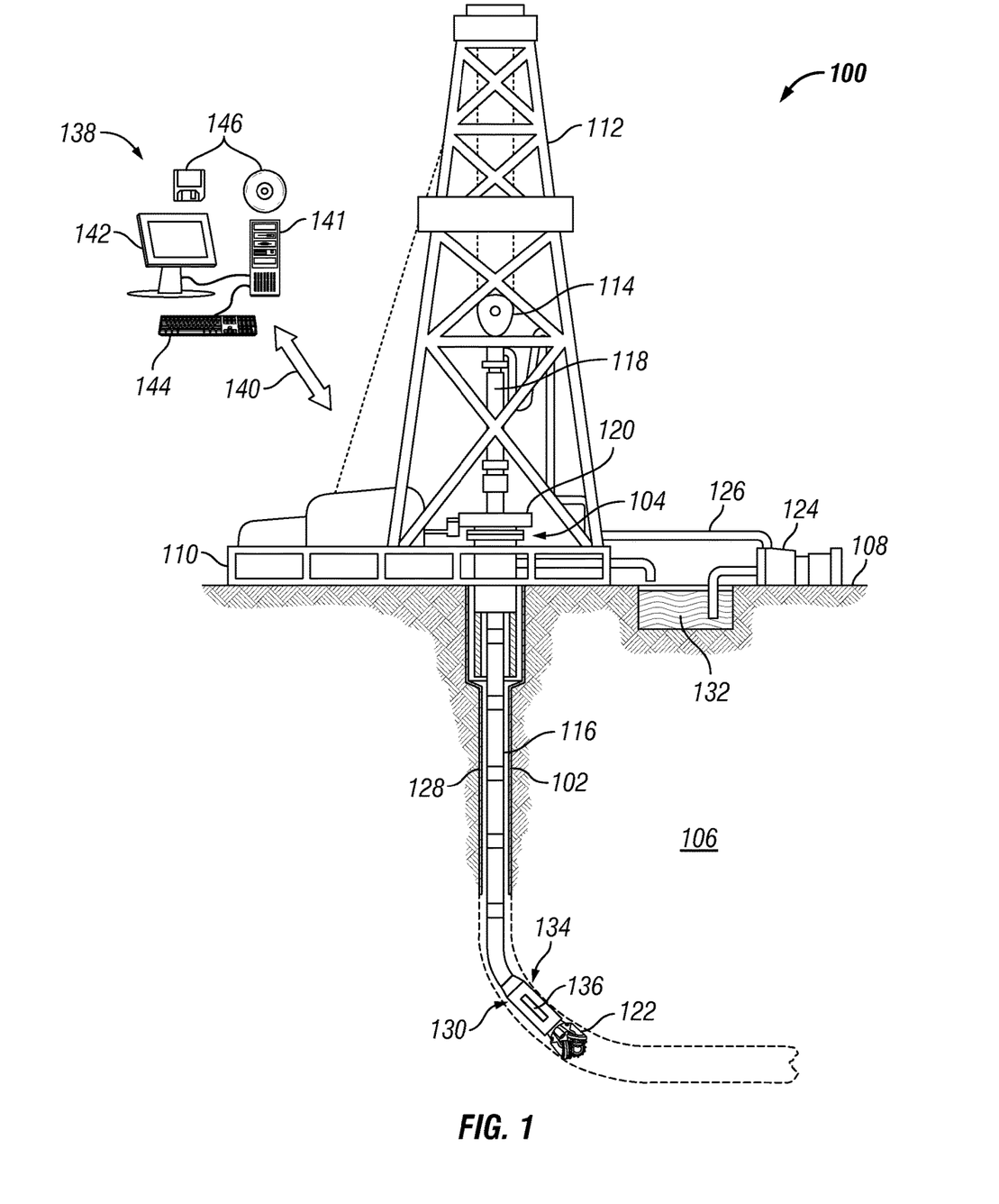
FIG. 1 illustrates an example of a drilling system.

FIG. 1 illustrates an example of drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however, wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at the distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may comprise any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may comprise at least one transducer 136a, which may be disposed at the surface of measurement assembly 134. It should be noted that while FIG. 1 illustrates a single transducer 136a, there may be any number of transducers disposed on measurement assembly 134. While illustrations may show transducers 136a-c, as seen below, references to transducer 136a apply to all transducers within the disclosure. Without limitation, transducers may be referred to as a transceiver. Without limitation, transducer 136a may also be disposed within measurement assembly 134 and there may be four other transducers that may be disposed ninety degrees from each other. However, it should be noted that there may be any number of transducers disposed along bottom hole assembly 130 at any degree from each other. Transducer 136a, and any other transducer, may function and operate to generate an acoustic pressure pulse that travels through borehole fluids. In examples, transducers 136a may further sense and acquire the reflected pressure wave which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived. Without limitation, transducers 136a may be made of piezo-ceramic crystals, or optionally magnetostrictive materials or other materials that generate an acoustic pulse when activated electrically or otherwise. In examples, transducers 136a may also include backing materials and matching layers. It should be noted that transducers 136a and assemblies housing transducers 136a may be removable and replaceable, for example, in the event of damage or failure.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving, and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter, and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole. As discussed below, methods may be utilized by information handling system 138 for automated calibration for steering model of drilling system 100.

Figure 2:
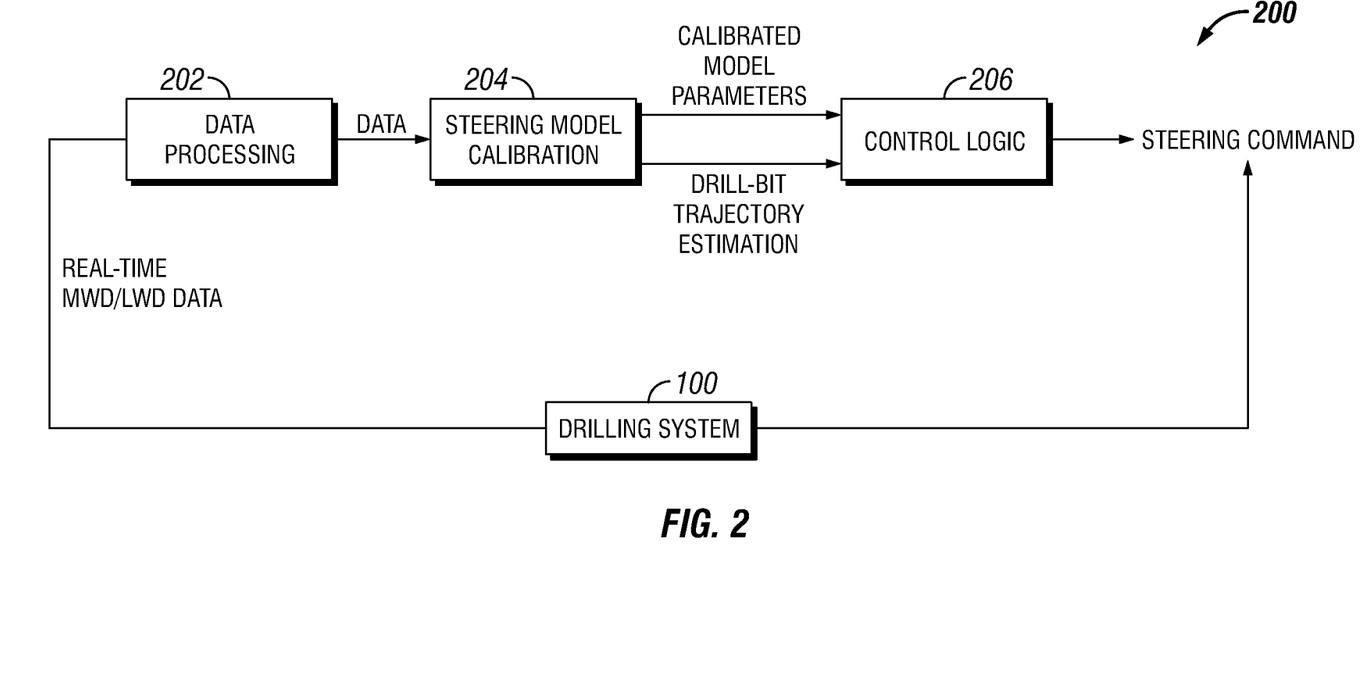
FIG. 2 illustrates a workflow for steering the drilling system.

FIG. 2 illustrates workflow 200 for automated calibration for steering model of drilling system 100 in accordance with particular embodiments. Workflow 200 begins with block 202. Block 202 is data processing which may be performed by information handling system 138 (e.g., referring to FIG. 1). During data processing, a quality check for of real-time MWD/LWD data is performed. The data is then organized and filtered to prevent outliers or corrupted data, due to inherent variability or measurement error, which may affect estimates and inferences. For example, a statistical method, adjusted boxplot, may be used to detect outliers. Outlier are defined as data points that fall out of the lower bound and upper bound of the data distribution after taking skewness of data into consideration. The data from block 202 is sent to block 204.

Block 204 performs steering model calibrations. In examples, steering model calibrations may operate and function to control drilling system 100 during drilling operations. For example, outputs from block 204 may be calibrated model parameters and drill-bit trajectory estimations, which may be transmitted to block 206. The operation and function of block 204 is discussed in greater detail below. The calibrated model parameters and drill-bit trajectory estimations may be utilized as inputs to control the function and operation of control logic in block 206. Control logic in block 206 may operate and function to control the trajectory, speed, revolutions-per-minute, and other parameters of drill bit 122 during drilling operations. Control logic in block 206 may be a model-based control logic, where the calibrated steering model is used to determine a corrective steering command such that at least one objective is achieved. This objective may minimize the discrepancy between the well trajectory and the well plan, or it may minimize curvature of the well trajectory. Without limitation, control logic in block 206 may solve an optimal control problem defined by the objectives and the steering model described to find the optimal steering commands. Any constraints such as a maximum curvature, or maximum discrepancy between the well plan and well trajectory may be defined within the optimal control problem. This may allow drilling system 100 to drill into formation 106 (e.g., referring to FIG. 1) at any suitable angle, horizontally, and/or the like. As illustrated in FIG. 2, sensors on bottom hole assembly 130 (e.g., referring to FIG. 1) may be used to monitor the movement, operations, and functions of drill bit 122 in formation 106 as real-time data. Real-time data from drilling system 100 may be feed back into block 202 for updated data processing. Based on the information provided to block 202 for data processing, the operations and functioning of drill bit 122 and bottom hole assembly 130 may change. Thus, there may be constant steering model calibration performed in block 204, which may continuously update the control logic in block 206.

Figure 3:
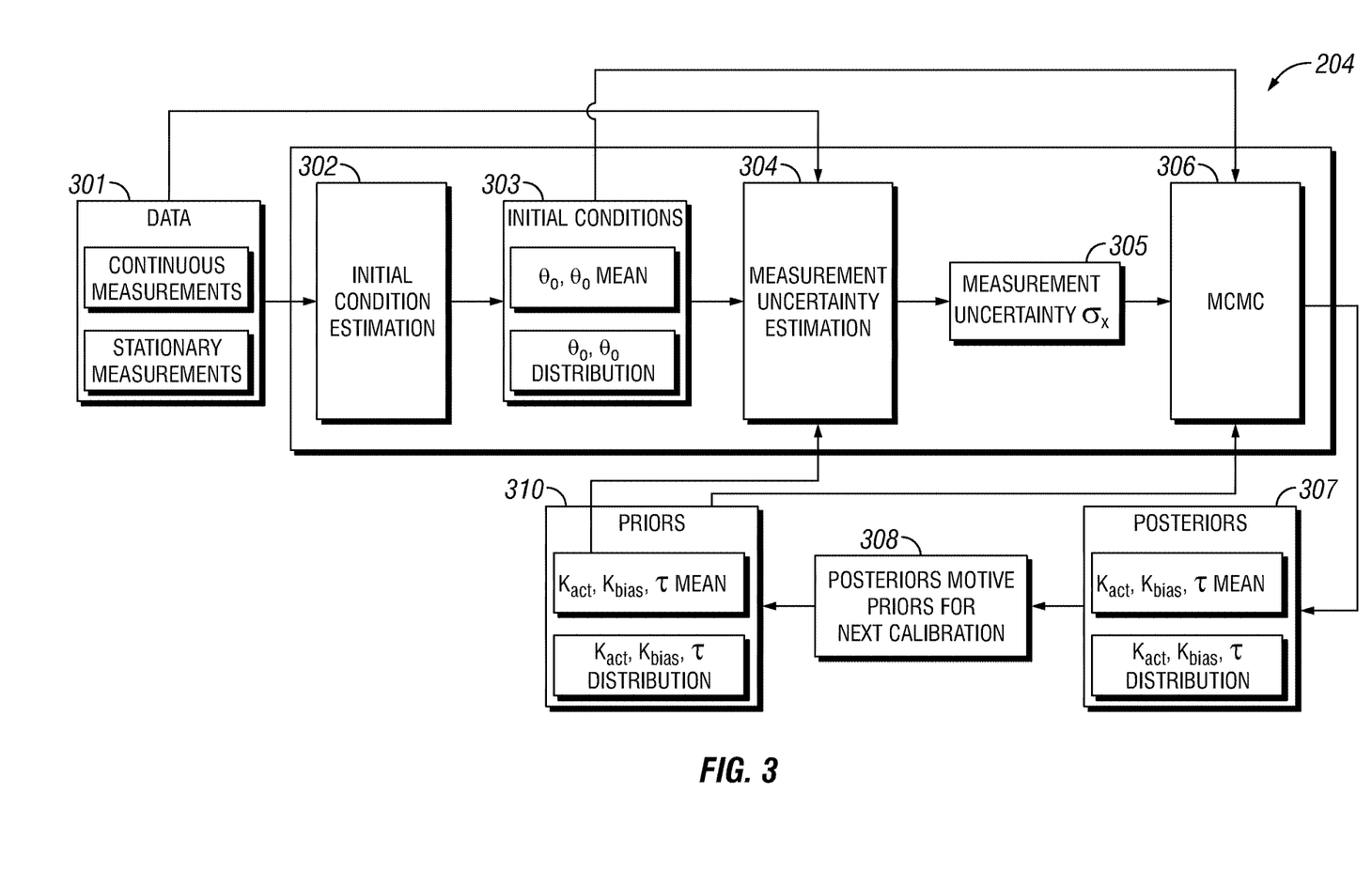
FIG. 3 illustrates a workflow for updating a steering model.

FIG. 3 further illustrates the operation and function of steering model calibration in block 204 from FIG. 2 in accordance with particular embodiments. Referring to FIG. 2, the data that is output from block 202 is identified in FIG. 3 as input 301. As illustrated, input 301 included continuous measurements and stationary measurements. Continuous measurements are found if drilling system 100 is performing continuous drilling operations. Stationary measurements are found if drilling operations have stopped for drilling system 100. Input 301, populated by the measurements discussed above, is fed into block 302.

Block 302 is an initial condition estimation. Variables defined within block 302 are the initial conditions $\theta_0$ and $\dot{\theta}_0$. The initial conditions are output 303. In examples, a statistical bagging process is used to calculate the mean and standard deviation for each initial condition. The process begins with a selection of window size $X_b$ which defines the maximum distance of measurements around an initial depth in which the measurements were taken to use for the initial condition estimate. If there are less than $n_{min}$ measurements within the window, the window is widened iteratively until $n_{min}$ measurements are included. Second, a random sample of the measurements is created by randomly selecting a percentage, identified as P %, of the measurements without replacement. Third, a least-squares linear fit is computed which gives an estimate of the initial conditions for that smaller random sample of the measurements. The process is repeated $n_{bag}$ times, creating new random samples in each iteration and storing the resulting initial condition estimates into the vectors $\theta_0$ and $\dot{\theta}_{0b}$. The mean and standard deviation of the vectors provide the mean and standard deviation for the initial conditions. With this process, a point estimate and measurement of uncertainty for the initial conditions may be obtained that is proportional to a measurement of noise.

Figure 4:
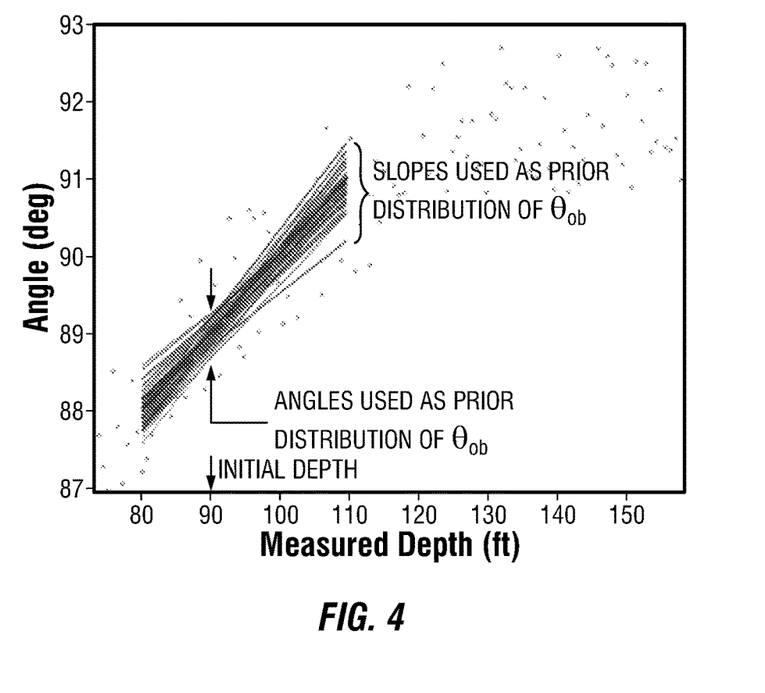
FIG. 4 illustrates a graph of a change in survey measurements used in an objective function.

The estimation process is represented graphically in FIG. 4. As illustrated, FIG. 4 uses simulated data as a visual representation of the statistical bagging process used to estimate the prior distributions of the initial conditions. In FIG. 4, $X_b$=[80,110] ft (24,417 meters). The group of lines is each best fit line to a different random sample from the measurements in window $X_b$.

Referring back to FIG. 3, output 303, the mean of the initial conditions, is fed into block 304. Block 304 is a measurement uncertainty estimation. During measurement operations, in block 304 the measurement uncertainty variable ax is calculated for the likelihood probability, which is found below in Equation (2), before calibration and estimation may take place. The measurement uncertainty is also identified as output 305. This variable captures the quality of the measurements and any model-system discrepancy which results from the model's inherently simplified approximation of a more complex system. Ultimately, the measurement uncertainty affects how much the current model should be calibrated to the measurements from the field. The measurement uncertainty is estimated by first fitting a model with loosely constrained parameters $\theta$. The fitting process is accomplished by minimizing the objective function (x, $\theta$) using any suitable optimization routine. The mean objective function value of the best fit is used as an estimate of $\sigma_x$ (i.e. the minimum value of the objective function divided by the number of measurements). For a sum of squares objective function, this is the mean squared error and is an estimate of the measurement variance. By using the model for measurement uncertainty estimation, corrupted data and unmodeled dynamics may be detected and the calibration may be prevented from producing a poor model estimate. This serves as a form of quality control for the calibration and attitude estimation process. The identified measurement uncertainty variable $\sigma_x$ is then used in block 306.

Block 306 is a Markov Chain Monte Carlo simulation (MCMC). In examples, the MCMC may be utilized to calibrate a steering model. The steering model may be calibrated and used to estimate a position of drill bit 122 (e.g., referring to FIG. 1) and attitude is the following depth-based second order differential equation, seen below as:

$$\tau\ddot{\theta}=-\dot{\theta}K_{act}u+K_{bias}, \text{ inital conditions: } \theta_0, \dot{\theta}_0 \qquad (1)$$

which describes the dynamics of bottom hole assembly 130 (e.g., referring to FIG. 1) in the inclination and azimuth planes. The variable $\theta$ represents the angle of drill bit 122 (either the inclination or azimuth plane), and u is the steering actuation input to information handling system 138. The calibrated parameters are identified as $\tau$ is a depth constant, $K_{act}$ is the magnitude of the bottom hole assembly 130 turning capability, $K_{bias}$ represents both the inherent steering tendency of bottom hole assembly 130 as well as any external forces on bottom hole assembly 130, $\theta_0$ is the initial angle (inclination or azimuth), and $\dot{\theta}_0$ is the initial curvature (build rate or walk rate). The dot notation in this equation represents a derivative with respect to distance, not time. Without limitation, $\theta$ is also used to represent a vector of the calibrated parameters.

During operations, in block 306, model calibration and estimation are performed with a Markov Chain Monte Carlo simulation (MCMC). The algorithm used below within the MCMC is a Metropolis-Hastings algorithm with adaptive proposal distributions and delayed rejection. Without limitation, any other suitable algorithm may also be used with the MCMC. The MCMC simulation is performed over an estimation horizon, D. For parameter estimation, a long horizon is used (generally D>90 feet (27 meters)), and for position and orientation estimation, a short horizon is used (generally D<90 feet (27 meters)). The measurements used for calibration in this horizon may include any sensor that measures inclination and or azimuth, for example, accelerometers, magnetometers, and/or the like.

In examples, the purpose of the MCMC simulation is to approximate a posterior distribution, in block 307, using Bayes' theorem. In block 307, the posterior distribution is defined as the following probability:

$$P(\theta|x) = \frac{P(x|\theta)P(\theta)}{P(x)} \qquad (2)$$

where the posterior distribution, P(θ|x), is the probability the parameters, θ, are the true system parameters given the measurements x have been observed. P(θ|x) is the probability the measurements x would be observed given the system has parameters θ (the likelihood probability), P(θ) is the probability the parameters θ are the true system parameters (the prior probability), and P(x) is the probability of measurements x occurring in general. In examples, (x) may be difficult to calculate, so instead, the Metropolis-Hastings algorithm iteratively produces a set of possible parameters θ according to the acceptance ratio:

$$P(\theta_{i+1} | \theta_i) = \min\left(1, \frac{P(x_{i+1} | \theta_{i+1})P(\theta_{i+1})}{P(x_i | \theta_i)P(\theta_i)}\right) \quad (3)$$

for i→n. The resulting distribution of accepted parameters θ approximates the posterior distribution. The posterior distribution describes the likelihood of parameter values (i.e. models) that describe the steering behavior of bottom hole assembly 130 (e.g., referring to FIG. 1) given all available information (measurements and prior distributions). The median of each parameter's posterior distribution is calculated and used to update the model which is then used to control or advise subsequent steering actions.

An integral part of an MCMC simulation is the selection of probability density functions ("PDF"). In this example, the PDF used for both the prior probability and the likelihood probability are the normal distributions:

$$P(\theta) = \frac{1}{\sqrt{2\pi}\,\sigma_\theta} e^{\frac{-(\theta-\mu)^2}{2\sigma_\theta^2}}, \; P(x|\theta) = \frac{1}{\sqrt{2\pi}\,\sigma_x} e^{\frac{-(f(x,\theta))^2}{2\sigma_x^2}} \quad (4)$$

The method of determining the mean and standard deviation, μ and $\sigma_\theta$ respectively, of the prior probability is discussed below. The variable ax is the estimate of measurement uncertainty, and (x, θ) is the value of the objective function. The objective function for the likelihood probability has a large impact on the accuracy of the calibration and estimation. In examples the following equation may be used:

$$f(x, \theta) = W_1 \Sigma_{j=1}^{j=M}(\hat{x}_j x_j)^2 + W_2 \Sigma_{i=1}^{i=S}(\hat{d}_i - d_i)^2 \quad (5)$$

Figure 5:
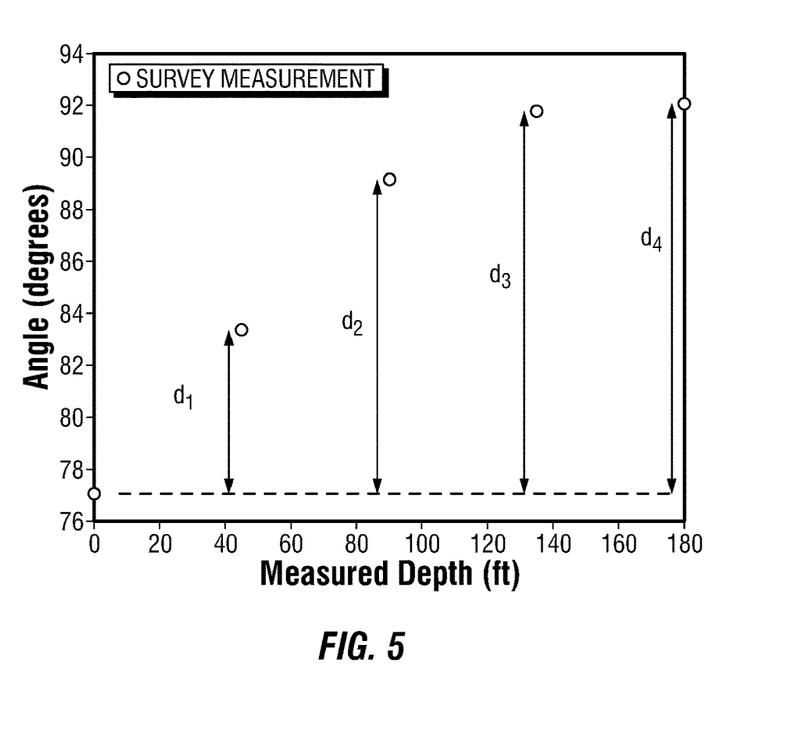
FIG. 5 illustrates a graph of a statistical bagging process.

In another example, a regularization term could be added to f(x, θ) that penalizes departure from the prior model parameters. Roughly, the objective function may produce measurements of parameters θ that may be similar to the measurements observed in the field. The weighting variable W may be used to give more weight to the continuous measurements or the stationary measurements in input 301, in the case of corrupted or missing data in either set. In examples, stationary measurements are taken when bottom hole assembly 130 is stationary, thus the measurements may be more precise due the absence of motion. In examples, the variable $x_j$ is a vector of continuous inclination measurements from any sensor on drill string 116 (e.g., referring to FIG. 1). Additionally, $\hat{x}_j$ is a vector of inclination estimates calculated using a model with parameters θ. Variable $d_i$ is the change in inclination measured from the first survey in the calibration horizon to the subsequent survey measurements, which is represented graphically in FIG. 5. Additionally, $\hat{d}_i$ is the respective change in estimated inclination of MCMC. By using the change in survey measurements, rather than absolute values, the calibration and estimation process may be fit to the data in their respective frames of reference.

Thus, biased/offset measurements do not have a negative effect on the accuracy of the calibration or estimation.

The parameters from block 306 that form posteriors in block 307 are sent to block 308 where posteriors in block 307 may motivate priors in block 310, for next calibration. In block 306, the prior probability, from block 310, of the parameters θ may be defined with a mean μ and standard deviation $\sigma_\theta$. For the first calibration and estimation, the prior probabilities may be selected based on a physical model of bottom hole assembly 130 (e.g., referring to FIG. 1) or post job analysis from a run with bottom hole assembly 130. The calibration and estimation procedures disclosed herein may be used for the post job analysis. Alternatively, for each subsequent calibration, the mean of the prior distributions may remain the same of update according to the calibration results from the previous horizon. Likewise, the standard deviations may remain the same or update according to several factors. For example, considering a well plan with a curve section, followed by a lateral section at 90-degree inclination, the standard deviation of the parameters $K_{act}$ and $K_{bias}$ may increase or decrease with the following general rules:

$$\sigma_{K_{act}} \propto D \cdot \text{mean}(u) \quad (6)$$

$$\sigma_{K_{bias}} \propto \frac{\text{inclination}}{D \cdot \text{mean}(u)} \quad (7)$$

For example, $$\sigma_{K_{bias}} = (1 - \text{abs}(\text{mean}(u))) \cdot (2 - \cos(\text{inclination})) \cdot \frac{45}{D} \quad (8)$$

The rational of this update scheme is based on the assumptions that over short horizons, D, steering responses in the system may be better captured by the bias parameter $K_{bias}$, and over long horizons, the random external forces tend to cancel each other out, and the steering response should be attributed to the steering input coefficient $\sigma_{K_{act}}$. Similarly, when the steering input actuation u is low over any horizon, the response should be attributed to the bias term. Inclination is also included because as bottom hole assembly 130 (e.g., referring to FIG. 1) drills closer to horizontal (inclination=90), the propensity for formation push increases due to the nature of drilling in between strata, so observed steering responses should be attributed more to the bias term in this situation.

Utilizing these methods may be beneficial in that the use of MCMC for model calibration is computationally cheap but produces estimates for parameters which are accurate and stable. The MCMC method further utilizes the techniques of delayed rejection and adaptive proposal covariances to speed up convergence and reduce estimation time. Additionally, the objective function used in the MCMC simulation separates the survey measurements and continuous measurements from input 301 into different reference frames. This overcomes the problem of unpredictable measurement bias/offset that can result from sensor processing algorithms or dramatic shifts in the drill-strings stable configuration while drilling. Furthermore, the probabilistic framework of the estimation allows for previous knowledge of the parameters to be given to the algorithm and improve the accuracy and usefulness of the model. This previous knowledge may come in the form of physics-based or data-driven models, previous runs with the tool, or personnel. The systems and methods may include any of the various features disclosed herein, including one or more of the following statements.

Statement 1: A method for calibrating a steering model may comprise estimating an initial condition for one or more variables in the steering model and calibrating the steering model with a Markov Chain Monte Carlo Simulation (MCMC).

Statement 2: The method of statement 1 further comprising estimating a measurement uncertainty based at least in part on the one or more variables.

Statement 3: The method of statement 2 further comprising updating a prior probability distribution for the one or more variables based at least in part on one or more posterior probabilities.

Statement 4: The method of statements 1 or 2, further comprising calculating a probability distribution for the one or more variables in the steering model.

Statement 5: The method of statement 4, further comprising fitting the one or more variables to the steering model by minimizing an objective function.

Statement 6: The method of statement 5, further comprising performing a sum of squares of the objective function.

Statement 7: The method of statements 1, 2, or 4, further comprising identifying a window at an initial depth for the estimating the initial condition.

Statement 8: The method of statement 7, further comprising selecting a random sample of measurements.

Statement 9: The method of statement 8, further comprising performing a least-squares linear fit on the random sample of measurements.

Statement 10: The method of statement 1, 2, 4, or 7, further comprising selecting a probability density function with the MCMC.

Statement 11: A method for controlling a drilling system may comprise drilling into a formation with a bottom hole assembly based at least in part on a steering model, processing one or more measurements from the bottom hole assembly, and calibrating the steering model based at least in part on the one or more measurements. The method may further comprise adjusting a control logic based at least in part on the steering model and adjusting the bottom hole assembly based at least in part on the control logic.

Statement 12: The method of statement 11, wherein calibrating the steering model may comprise estimating an initial condition for one or more variables in the steering model, estimating a measurement uncertainty based at least in part on the one or more variables, calibrating the steering model with a Markov Chain Monte Carlo Simulation (MCMC) with the measurement uncertainty, and updating a prior probability distribution for the one or more variables based at least in part on one or more posterior probabilities.

Statement 13: The method of statement 12, further comprising calculating a probability distribution for the one or more variables in the steering model.

Statement 14: The method of statement 13, further comprising fitting the one or more variables to the steering model by minimizing an objective function.

Statement 15: The method of statement 12, further comprising identifying a window at an initial depth for the estimating the initial condition.

Statement 16: The method of statement 15, further comprising selecting a random sample of measurements.

Statement 17: The method of statement 16, further comprising performing a least-squares linear fit on the random sample of measurements.

Statement 18: A drilling system may comprise a bottom hole assembly that may comprise a drill bit connected to the bottom hole assembly and one or more sensors connected to the bottom hole assembly. The drilling system may further comprise a drill string connected to the bottom hole assembly and an information handling system connected to the bottom hole assembly. The information handling system may be configured to process one or more measurements from the bottom hole assembly, calibrate a steering model based at least in part on the one or more measurements, adjust a control logic based at least in part on the steering model, and adjust the bottom hole assembly based at least in part on the control logic.

Statement 19: The drilling system of statement 18, wherein the information handling system is further configured to estimate an initial condition for one or more variables in the steering model, estimate a measurement uncertainty variable based at least in part on the one or more variables, calibrate the steering model with a Markov Chain Monte Carlo Simulation (MCMC) with the measurement uncertainty variable, and update a prior probability distribution for the one or more variables based at least in part on one or more posterior probabilities.

Statement 20: The drilling system of statement 19, wherein the information handling system is further configured to calculate a probability distribution for the one or more variables in the steering model, fit the one or more variables to the steering model by minimizing an objective function, and perform a sum of squares objective function on the objective function.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for calibrating a steering model for a drilling system comprising:
    estimating an initial condition for one or more variables in the steering model by utilizing at least part of a statistical bagging process; and
    calibrating the steering model with a Markov Chain Monte Carlo Simulation (MCMC), wherein MCMC utilizes an objective function which separates survey measurements and continuous measurements into different reference frames.

2. The method of claim 1 further comprising estimating a measurement uncertainty based at least in part on the one or more variables.

3. The method of claim 2 further comprising updating a prior probability distribution for the one or more variables based at least in part on one or more posterior probabilities.

4. The method of claim 1, further comprising calculating a probability distribution for the one or more variables in the steering model.

5. The method of claim 4, further comprising fitting the one or more variables to the steering model by minimizing the objective function.

6. The method of claim 5, further comprising performing a sum of squares objective function.

7. The method of claim 1, further comprising identifying a window at an initial depth for estimating the initial condition.

8. The method of claim 7, further comprising selecting a random sample of measurements.

9. The method of claim 8, further comprising performing a least-squares linear fit on the random sample of measurements.

10. The method of claim 1, further comprising selecting a probability density function with the MCMC.

11. A method for controlling a drilling system comprising:
    drilling into a formation with a bottom hole assembly based at least in part on a steering model;
    processing one or more measurements from the bottom hole assembly;
    calibrating the steering model based at least in part on the one or more measurements, wherein the calibrating at least comprises an objective function which separates survey measurements and continuous measurements into different reference frames;
    adjusting a control logic based at least in part on the steering model; and
    adjusting the bottom hole assembly based at least in part on the control logic.

12. The method of claim 11, wherein calibrating the steering model comprises:
    estimating an initial condition for one or more variables in the steering model;
    estimating a measurement uncertainty based at least in part on the one or more variables;
    calibrating the steering model with a Markov Chain Monte Carlo Simulation (MCMC) with the measurement uncertainty; and
    updating a prior probability distribution for the one or more variables based at least in part on one or more posterior probabilities.

13. The method of claim 12, further comprising calculating a probability distribution for the one or more variables in the steering model.

14. The method of claim 13, further comprising fitting the one or more variables to the steering model by minimizing the objective function.

15. The method of claim 12, further comprising identifying a window at an initial depth for the estimating the initial condition.

16. The method of claim 15, further comprising selecting a random sample of measurements.

17. The method of claim 16, further comprising performing a least-squares linear fit on the random sample of measurements.

18. A drilling system comprising:
    a bottom hole assembly comprising:
    a drill bit connected to the bottom hole assembly;
    one or more sensors connected to the bottom hole assembly;
    a drill string connected to the bottom hole assembly; and
    an information handling system connected to the bottom hole assembly and configured to:
    process one or more measurements from the bottom hole assembly;
    calibrate a steering model based at least in part on the one or more measurements, wherein the calibrating at least comprises an objective function which separates survey measurements and continuous measurements into different reference frames;
    and adjust the bottom hole assembly based at least in part on the steering model.

19. The drilling system of claim 18, wherein the information handling system is further configured to:
    estimate an initial condition for one or more variables in the steering model;
    estimate a measurement uncertainty variable based at least in part on the one or more variables;
    calibrate the steering model with a Markov Chain Monte Carlo Simulation (MCMC) with the measurement uncertainty variable; and
    update a prior probability distribution for the one or more variables based at least in part on one or more posterior probabilities.

20. The drilling system of claim 19, wherein the information handling system is further configured to:
    calculate a probability distribution for the one or more variables in the steering model;
    fit the one or more variables to the steering model by minimizing the objective function; and
    perform a sum of squares objective function.

* * * * *